United States Patent [19]
Long et al.

[11] Patent Number: 5,616,093
[45] Date of Patent: Apr. 1, 1997

[54] ELECTRO-HYDRAULIC CONTROL SYSTEM IN A POWER TRANSMISSION

[75] Inventors: Charles F. Long, Pittsboro; Jeffrey J. Cole, Plainfield; Phillip F. McCauley, Zionsville, all of Ind.

[73] Assignee: General Motors Corporation, Detroit, Mich.

[21] Appl. No.: 542,572

[22] Filed: Oct. 13, 1995

[51] Int. Cl.$^6$ ............................................. F16H 61/00
[52] U.S. Cl. ............................ 475/120; 475/123; 477/130
[58] Field of Search ........................... 475/120, 119, 475/121, 123, 128, 122; 477/130, 906

[56] References Cited

U.S. PATENT DOCUMENTS

| | | | |
|---|---|---|---|
| 5,182,969 | 2/1993 | Goto et al. | 477/906 X |
| 5,342,253 | 8/1994 | Mizobe et al. | 475/120 X |
| 5,375,483 | 12/1994 | Kim et al. | 475/120 X |
| 5,376,056 | 12/1994 | Wakahara et al. | 475/123 |
| 5,382,201 | 1/1995 | Iizuka | 475/123 |
| 5,454,763 | 10/1995 | Ikebuchi et al. | 475/123 X |
| 5,496,231 | 3/1996 | Eaton | 477/906 X |
| 5,507,706 | 4/1996 | Jang et al. | 477/130 |

FOREIGN PATENT DOCUMENTS 565111  10/1993  European Pat. Off. .............. 475/123

*Primary Examiner*—Charles A. Marmor
*Assistant Examiner*—Peter Kwon
*Attorney, Agent, or Firm*—Donald F. Scherer

[57] ABSTRACT

Power transmissions incorporate gear ratios including a plurality of forward ratios, a neutral condition and at least one reverse ratio. The establishment of each ratio is controlled by selectively engageable hydraulically operated friction devices, such as clutches and brakes. The interchange between forward ratios is controlled by the interchange of at least one friction device. The control elements to accomplish the establishment and interchange of the ratios include a pressure source, shift valve, solenoid control valves and pressure control valves. The solenoid valves are electrically actuated and the hydraulic portion of the control includes elements that permit continued operation of the transmission in selected ratios in the event of electrical discontinuance. Also provided within the hydraulic control is a pressure knockdown or pressure reducing valve element which operates with one of the shift valves to establish a maximum pressure level in the forward ratios that is less than the maximum pressure level in the reverse ratio.

2 Claims, 15 Drawing Sheets

5,616,093

ELECTRO-HYDRAULIC CONTROL SYSTEM IN A POWER TRANSMISSION

TECHNICAL FIELD

This invention relates to power transmission controls for establishing gear ratios and the interchange thereof.

BACKGROUND OF THE INVENTION

Power transmissions of the automatic shifting type have a plurality of selectively establishable gear ratios between the engine and ground engaging mechanism for the vehicle. The ratios are generally established by hydraulically operated friction devices such as clutches and brakes. The engagement and disengagement of these devices is controlled by valve mechanisms which direct hydraulic fluid to and from the operating piston of the respective devices. The valve mechanisms have been controlled between upshifted and downshifted positions by control pressure and springs. The control pressure can be established by mechanical mechanisms such as governors and throttle valves or by electrical elements such as solenoids.

SUMMARY OF THE INVENTION

It is an object of the present invention to provide an improved electro-hydraulic control in a power transmission having three relay valves selectively positioned to supply hydraulic fluid from two variable pressure control valves to selective friction devices for controlling the engagement and disengagement of the devices.

In one aspect of the invention, at least one of the relay valves is manipulated between a first spring set position and a second pressure set position at least twice as the transmission forward ratios are sequenced between the lowest and highest ratios.

In another aspect of this invention, a pair of variable output pressure valves are ported through the relay valves to control pressure rise and decay in the separate on-coming and off-going devices.

In still another aspect of this invention, the variable output pressure valves are operated in opposite sense during a ratio interchange; that is, one valve is increasing in pressure while the other is decreasing in pressure.

In a further aspect of this invention, the variable output pressure valves have a current proportional force motor to produce a proportional pressure which provides a control pressure for a downstream pressure control valve from which the pressurized fluid is directed by the relay valves to the proper friction device.

In yet a further aspect of this invention, the output pressure of one of the downstream pressure control valves is at a minimum pressure when the output pressure from the proportional pressure valve is at a high pressure and the other pressure control valve is at a high pressure when the output of the proportional pressure valve is at a high pressure.

DESCRIPTION OF AN EXEMPLARY EMBODIMENT

Figure 1:
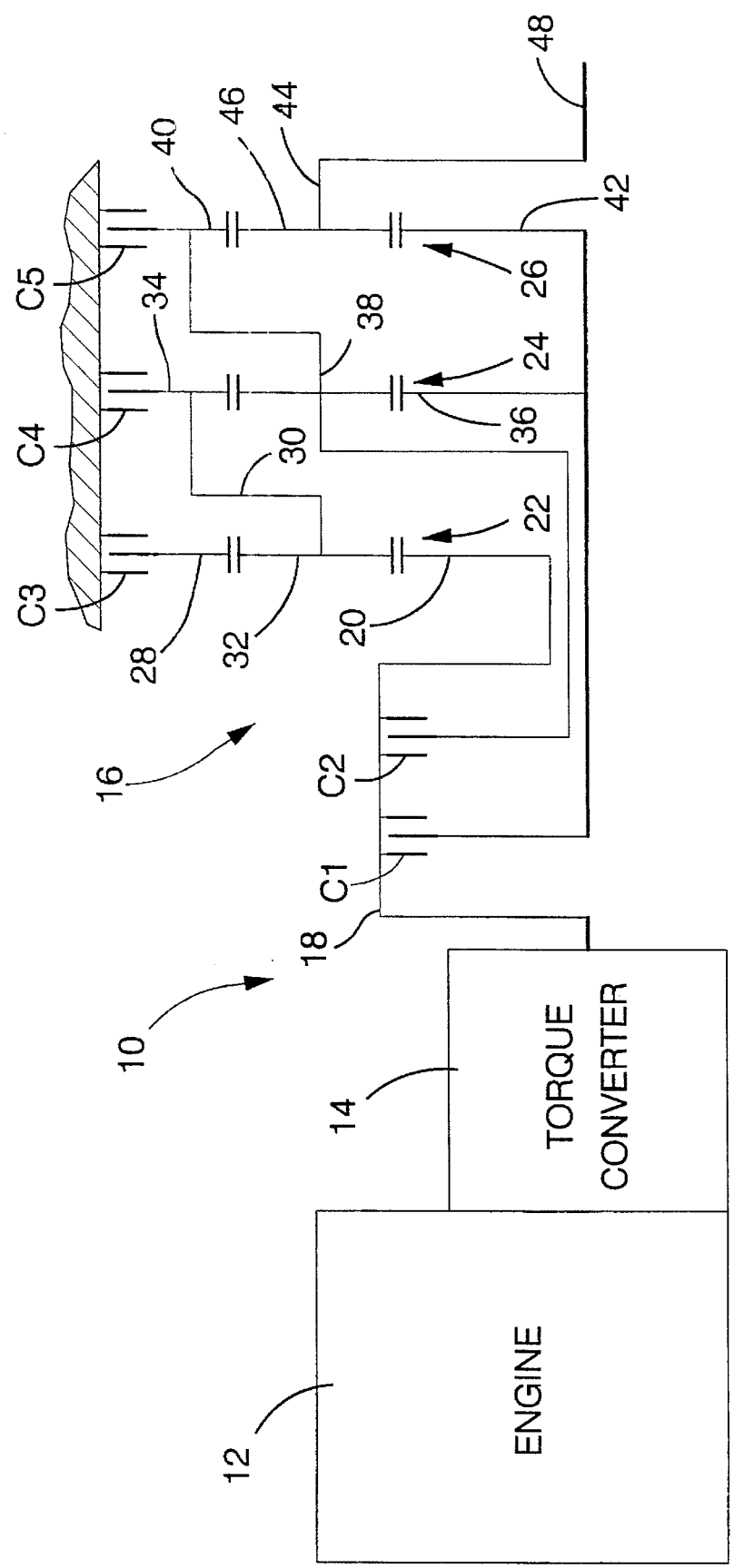
FIG. 1 a schematic representation of a powertrain capable of using the present hydraulic control.

A powertrain 10 is shown in FIG. 1 and includes an engine 12, a torque converter and electro-hydraulic controls 14 and a multi-speed planetary gear arrangement 16.

The engine and torque converter 12 and 14 are conventional devices and the planetary gear arrangement 16 is constructed preferably in accordance with that shown in U.S. Pat. No. 4,070,927 issued to Polak and assigned to the assignee of the present invention.

The planetary gear arrangement 16 includes an input hub 18 driven by the engine 12 through the torque converter 14. The input hub 18 is continuously drive connected with a sun gear 20 which is a member of a first planetary gear set 22. The planetary gear arrangement 16 also includes planetary set 24 and 26. The planetary set 22 has a ring gear 28 selectively connected to ground through a brake C3 and a carrier element 30 supporting pinion gears 32 and drivingly connected to a ring gear 34 which is an element of planetary set 24. The ring gear 34 is selectively connected to ground by a brake C4.

The planetary set 24 also includes a sun gear 36 drivingly connected with a clutch C1 which is selectively operable to connect the sun gear 36 to the hub 18. The planetary set 24 further includes a carrier member 38 which is selectively connectable with the hub 18 by a clutch C2 and to ground by a selectively engageable brake C5. The brake C5 is also effective to ground a ring gear 40 which is a member of the planetary set 26.

The planetary set 26 also includes a sun gear 42 which, along with sun gear 36, is connected with the clutch C1 and a carder member or assembly 44 which rotatably supports a plurality of pinions 46. Carrier 44 is connected to a transmission output shaft 48 which is drivingly connected with conventional ground engaging mechanisms such as wheels or tracks, not shown.

The planetary gear arrangement 16, shown in FIG. 1, will provide, upon selective engagement and disengagement of clutches C1, C2 and brakes C3, C4 and C5, six forward ratios, a neutral condition and a reverse ratio. The first forward ratio is provided by engagement of the clutch C1 and the brake C5. The interchange from first to second is established by disengagement of C5 and engagement of C4. The interchange from second to third is provided by the disengagement of C4 and the engagement of C3. The fourth forward ratio provided by the disengagement of C3 and the engagement of clutch C2. The fifth forward ratio is provided by the interchange of clutch C1 and brake C3. This provides an overdrive ratio between the hub 18 and the output shaft 48. The sixth and highest forward speed ratio is provided by the interchange brake C3 and brake C4 while the clutch C2 remains engaged.

The neutral condition is provided by the disengagement of all the friction devices. However, during neutral, if desired, the brake C5 can be engaged and this would be the general operating condition of the transmission. The reverse ratio is provided by the engagement of brakes C3 and C5. During reverse ratio, the input drive from the hub 18 is directly to the sun gear 20 and the planetary set 24 provides the reversing function within the transmission gearing. The above-mentioned U.S. Pat. No. 4,070,927 provides a more complete description of the operation and structure of this planetary gear arrangement.

Figure 2A:
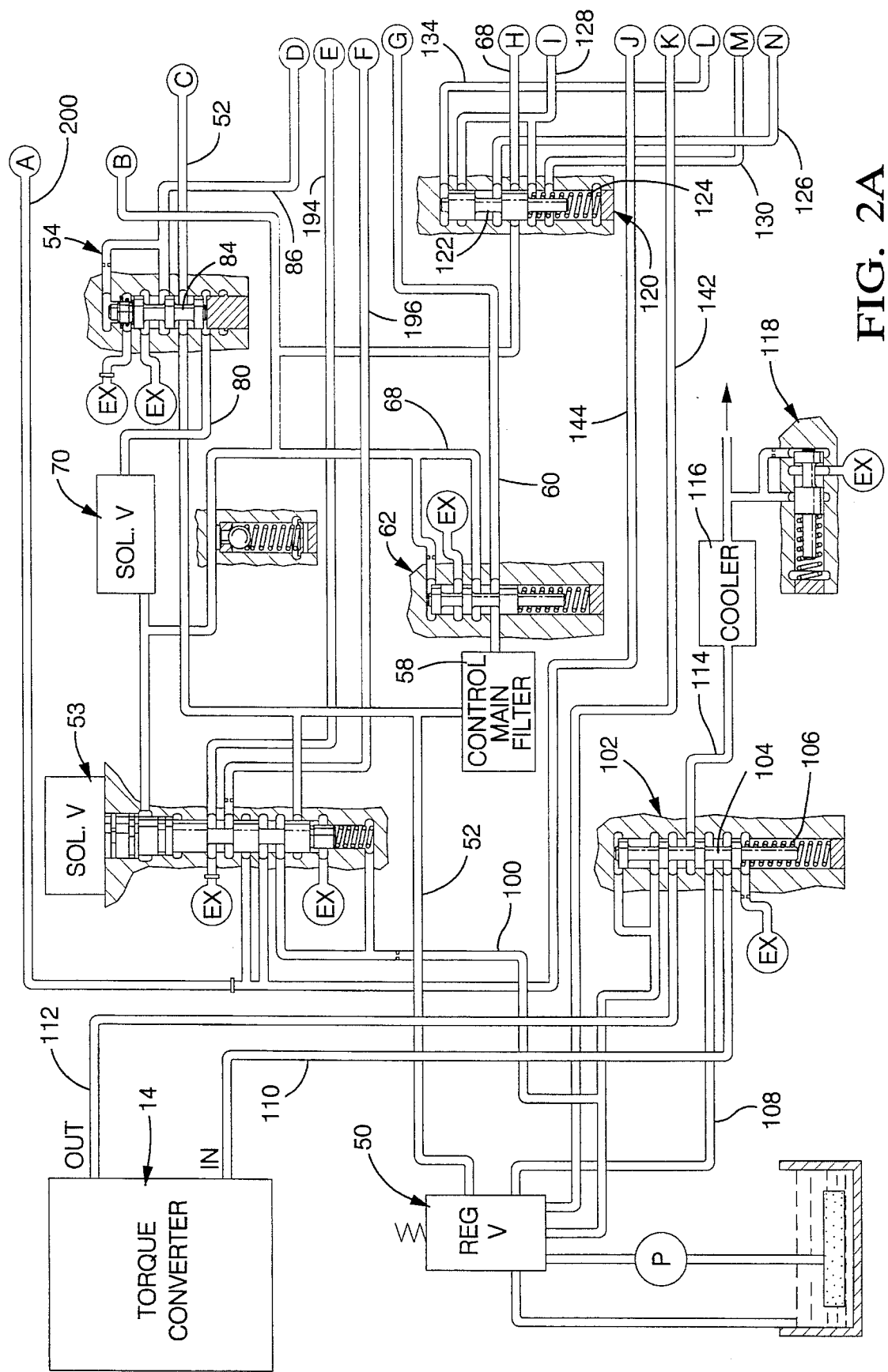
FIGS. 2A and 2B is a schematic representation of the hydraulic control utilized to establish the engagement and disengagement of friction devices shown in FIG. 1.
Figure 2B:
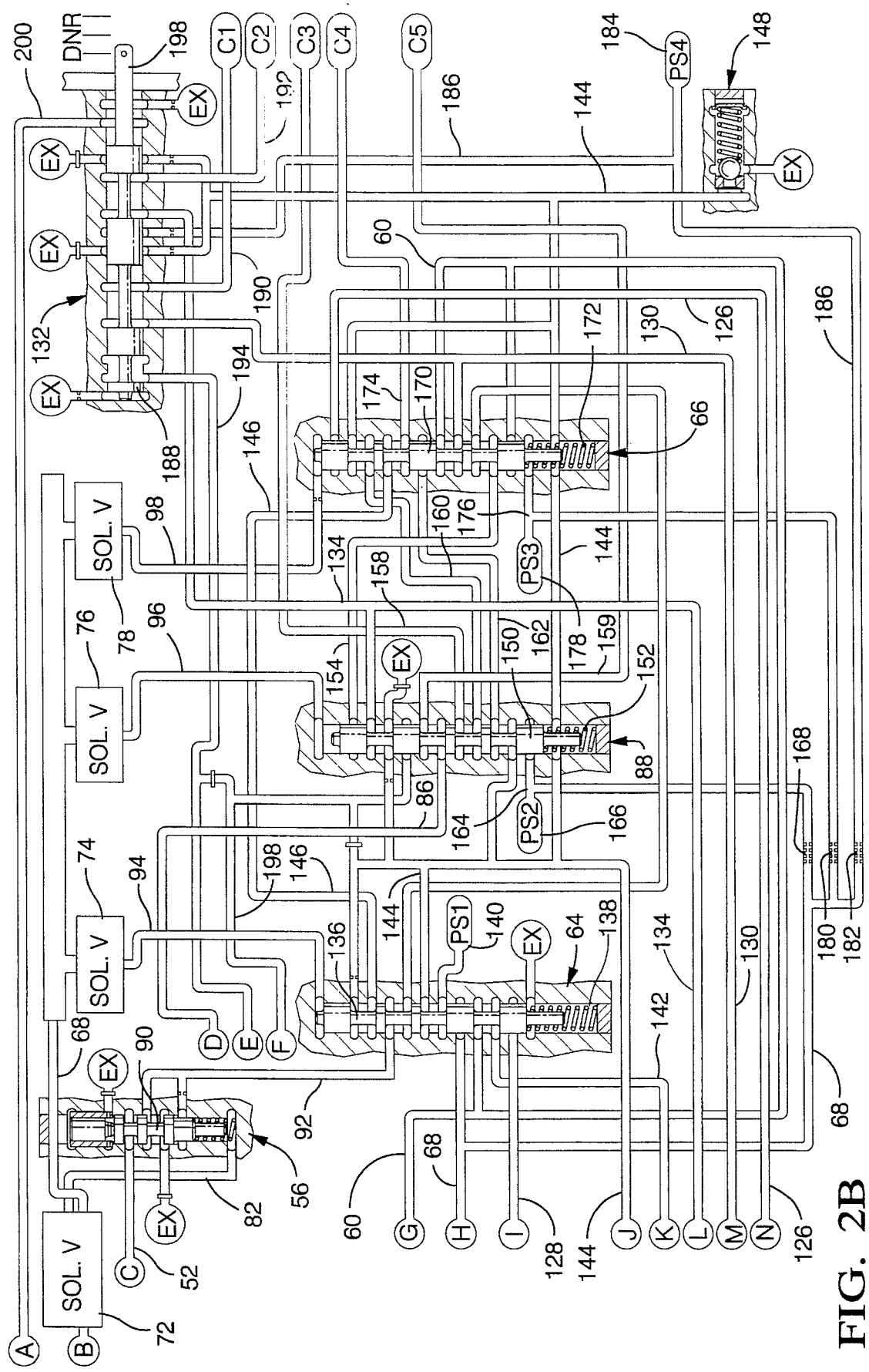

The clutches and brakes of the planetary gear arrangement 16 are controlled by hydraulic fluid which is distributed by an electro-hydraulic control system as shown in FIGS. 2A and 2B. The electro-hydraulic system includes a conventional hydraulic positive displacement pump and regulator valve 50 which distributes fluid to a main or high pressure passage 52. The fluid pressure in passage 52 is delivered to a pulse-width-modulated solenoid valve 53 which controls the engagement and disengagement of a converter clutch, not shown, which is incorporated in a conventional manner in the torque converter 14. The main passage 52 also directs fluid pressure through a pressure control valve 54 and a pressure control valve 56.

The fluid in main passage 52 passes through a filter 58 and into a filtered main passage 60 which has the same pressure level as the fluid in passage 52. The fluid in passage 60 is connected to a pressure control valve 62 and a pair of relay valves or shift valves 64 and 66. The pressure control valve 62 has an output passage 68 which delivers a reduced fluid pressure fluid from the passage 60 to the pulse-width-solenoid 53, a solenoid valve 70, a solenoid valve 72, a solenoid valve 74, a solenoid valve 76 and a solenoid valve 78.

The pressure control valve 62 is a conventional downstream pressure regulator valve in that the pressure in passage 68 is fed back to the valve 62 to induce closing of the valve to limit the pressure in passage 68 to a fixed value whenever the pressure in the passage 60 is at or above that pressure level.

The solenoid valves 70 and 72 are conventional solenoid valves that provide a variable pressure output which varies in accordance with the current imposed upon the coils of the solenoid valves 70 and 72. These valves operate in a well known manner such that the solenoid valve 70 produces a variable pressure in a passage 80 and the solenoid valve 72 produces a variable pressure in a passage 82. The pressure in passage 80 is connected with the pressure control valve 54. This valve 54 includes a spool valve 84 which is operable in response to the variable pressure in passage 80 to control fluid distribution from the passage 52 to a clutch feed passage 86.

The pressure in clutch feed passage 86 is distributed to a relay valve or shift valve 88 and also is directed to operate on the spool valve 84 so as to limit the output pressure in passage 86 to a value proportional to the pressure in passage 80. Thus, the pressure in passage 86 increases as the pressure in passage 80 increases.

The passage 82 is in fluid communication with the valve 56 where it acts upon a valve spool 90 to control distribution of fluid from the main passage 52 to a clutch feed passage 92 which is connected with the relay valve 64. The valve 56 has a function opposite to that of the valve 54. In other words, as the pressure in passage 82 increases, the pressure in passage 92 decreases. The pressure in passage 82 operates on the valve spool 90 to cause the valve spool to discontinue operation or fluid distribution between the passage 52 and 92. As the pressure in passage 82 decreases, fluid pressure in passage 68 is also acting on the valve spool 90 to open the valve 56 thereby providing fluid communication between passages 52 and 92.

The pressure in passage 92 cooperates with the pressure in passage 82 to induce closing of the valve 56. Therefore, the pressure in passage 92 increases as the pressure in passage 82 decreases. Both of the valves 70 and 72 are of the normally open type, that is, when no electrical energy is provided to these valves, the valves are open and provide maximum output pressure. Thus when electrical energy is provided to these valves, the pressure in passage 86 will be at a maximum value when the electrical energy to solenoid 70 is maximum while the pressure in valve 92 will be at a minimum value when the electrical energy to the solenoid 72 is maximum. Thus, a range of pressure can be controlled and supplied by the valves 54 and 56.

The solenoid valves 74, 76 and 78 are conventional on/off type solenoid valves of the normally closed variety. That is, whenever electrical energy is not provided to the valves, they do not supply downstream fluid pressure. The solenoid valve 74 provides fluid pressure to a control passage 94 whenever the solenoid valve 74 is opened. The passage 94 is in fluid communication with the relay valve 64. The solenoid valve 76 provides for controlled pressure distribution to a control passage 96 which is in fluid communication with relay valve 88 and the solenoid valve 78 provides fluid distribution to a control passage 98 which is in fluid communication with relay valve 66.

The solenoid valve 53, which controls the engagement and disengagement of the torque converter clutch, not shown, is operable to control distribution of fluid pressure from passage 52 to a control passage 100 which is in fluid communication with the pump and regulator valve 50 and with a converter regulator valve 102.

The pressure in passage 100 is operable on the regulator valve 50 in a well known manner to provide for reduction in the pressure in passage 52 proportional to the pressure in passage 100. Such pressure reduction controls are well known in the power transmission control field.

The passage 100 operates on one end of a spool valve 104 which is a component of the converter regulator valve 102. The other end of the spool valve 104 is operated on by a spring 106. The spring is operable to urge the valve spool 104 to a position such that converter feed pressure in passage 108 is directed through the valve spool 104 to a converter end passage 110 to feed fluid pressure to the converter 14 in a well known manner to permit hydrodynamic fluid drive within the torque converter. The fluid flowing from the torque converter in this situation is directed to a passage 112 which is also connected with the valve 102.

In the valve position shown, the fluid in passage 112 is directed to a cooler and lubrication passage 114 through which it is distributed through a cooler 116 into lubrication passages, not shown. The fluid pressure in the lubrication passage is controlled by a conventional pressure regulator valve 118.

When the fluid pressure in passage 100 reaches a predetermined value, the valve spool 104 of valve 102 will be shifted against the spring 106 thereby providing fluid communication between the passage 112 and passage 100 and substantially simultaneously providing fluid communication between the passage 110 and the passage 114. This will reverse the fluid connections to the torque converter 14 such that fluid input to the torque converter will be via passage 112 while any fluid exhaust is dumped to an exhaust passage at the valve 102. This is a conventional method of engaging a torque converter clutch. The normal torque converter clutch feed passage 108 is directed by the valve 102 to the cooler passage 114 and hence to the lubrication system.

The fluid pressure in passage 68 is also in fluid communication with a forward pressure knockdown valve or flow distribution valve 120. The valve 120 has a valve spool 122 which is urged to the position shown by a spring 124. In this position, the valve spool 122 prevents fluid distribution in passage 68 to a control passage 126. However, fluid pressure in passage 68 is directed through the valve 120 to the relay valve 64. The valve 120 also is communicated with a control passage 128 which is connected with the relay valve 64 and the valve 120 is also in fluid communication with a control passage 130 which communicates with the relay valve 66 and a manual selector valve 132.

In the spring set position shown, the valve spool 122 permits fluid communication between the passages 130 and 128 while preventing fluid communication between the passage 68 and the passage 126. The valve spool 122 can be shifted against the spring force by fluid pressure in a control passage 134 which is in fluid communication with the relay valve 88 and the manual shift valve or selector valve 132.

The relay valve 64 includes a valve spool 136 which is urged to the position shown by a spring 138. The valve spool 136 may be moved against the spring 138 by fluid pressure in passage 94 as provided by the solenoid valve 74.

As previously mentioned, the relay valve 64 is in fluid communication with passages 128, 68, 60 and 92. The spring 138 is in a chamber which is in fluid communication with and exhaust passage. The valve 64 is also in fluid communication with a pressure switch 140 and fluid passages 142, 144 and 146. The passage 142 is a forward knockdown pressure passage which is in fluid communication with the regulator valve 50. The fluid pressure when available in this passage is operable to reduce the output pressure of the regulator valve 50 such that the pressure in passage 52 is reduced. The passage 144 is in fluid communication with the relay valve 88 and 64, an exhaust control valve 148 and the manual selector valve 132.

The exhaust control valve 148 is a conventional ball dump valve which is operable to maintain a minimum pressure in the passage 144 at all times. As is well known, it is often preferable to maintain a minimum pressure in fluid operated friction devices to reduce the time required to engage such devices. The controlled exhaust in passage 144 is also in fluid communication with the pulse-width-modulated valve 53. The relay valve 88 includes a valve spool 150 which is acted upon by a spring 152 to urge the valve spool 150 upward as seen in FIG. 2B. The valve spool 150, however, is moved downward by fluid pressure in passage 96 as controlled by the solenoid valve 76.

The control is shown in the forward position as indicated by the drive indicator D on the manual selector valve 132 and the solenoid valves are conditioned for the lowest forward ratio such that solenoid 76 is energized and therefore fluid pressure in passage 96 is maintaining the valve spool 150 downward against the spring 152. As previously mentioned, the valve 88 is in fluid communication with the passage 86, the passage 144 and the passage 96. Valve 88 is also in fluid communication with a passage 159 which is connected with the friction device C5. Thus, the relay valve 88 controls the distribution of pressure for engagement and disengagement of the friction devices C3 and C5. The valve spool 150 also controls fluid pressure distribution to passage 154 which is communicated with valve 66, passage 134 which is communicated with the manual selector valve 132, passage 158 which is communicated with the friction brake C3, passage 160 which is communicated with the valve 66, passage 162 which is communicated with the valve 66 and passage 164 which is connected with a pressure switch 166 and through a multiple restriction orifice 168 to the passage 68.

In the pressure set position shown, the passage 86 which has pressure distributed by control valve 54 is directed to passage 158 and therefore to the brake C3 such that the brake C3 is engaged. The valve 66 has a slidable valve spool 170 which is urged to the position shown by a spring 172 and may be urged to a pressure position against the spring 172 via fluid pressure in passage 98 as supplied by the solenoid valve 78.

The valve 66 is in fluid communication with the passage 60, the passage 98, the passage 160, the passage 162, the passage 146, the passage 130, the passage 126 and the passage 144. The valve 66 is also in fluid communication with a passage 174 which is connected with the friction device C4. The valve 66 therefore controls fluid distribution for the engagement and disengagement of friction device C4.

As will become apparent later, the relay valve 66 also controls distribution of fluid pressure for the engagement and disengagement of the friction device C1. The relay valve 66 also communicates with a passage 176 which is connected to a pressure switch 178. The passage 176 communicates through a multiple restriction orifice 180 with passage 68. The passage 68 also communicates through a multiple restriction orifice 182 with a pressure switch 184 via passage 186 which also communicates with the selector valve 132.

The pressure switches 140, 166, 178 and 184 are signal devices for use by the electrical portion of the control to determine the position of relay valves 64, 88 and 66 and the selector valve 132. For example, as seen in FIG. 2B, the pressure switch 140 is connected with exhaust 144, the pressure switch 166 is blocked by the valve spool 150 from exhaust, the pressure switch 178 is connected with the exhaust 144 and the pressure switch 184 is blocked by the selector valve 132. Fluid pressure in passage 68 will pressurize the switch 166 and switch 184 thereby giving the electronic control an indication of the position of the valves.

The selector valve 132 includes a valve spool 188 which is manipulable by an operator to a drive position "D", a neutral position "N" and a reverse position "R". A park position can be added, if desired. The manual selector valve 132 is in fluid communication, as previously mentioned, with the passage 130 and passage 186 and is also in fluid communication with a clutch engage passage 190 which communicates with the clutch C1 and with passage 192 which communicates with clutch C2. The manual selector valve 132 also has connected therewith a passage 194 which communicates with the pulse-width-modulated valve 53. The pulse-width-modulated valve, as well connected with a plurality of the passage already described, is also in fluid communication with a passage 196 which communicates with the relay valve 88.

The schematic control shown in FIGS. 2A and 2B is described as including a manual selector valve 132. It is possible to utilize an electronically or electrically controlled solenoid valve, if desired. To accomplish this, a manual stem 198 is removed, a spring is installed and the pressure switch 184 is connected to the spring chamber which is not exhausted. The other end of the valve 132 is connected with an off/on solenoid which may be added to the passage 68.

Other minor changes in the control occur in that some passages that are blocked, such as passage 144, is connected with the selector valve via a passage 200. However, the essential control functions do not change between an electrically actuated selector valve and a manually actuated selector valve. When an electrically actuated manual selector valve is utilized, the system will provide reverse drive in the event of electrical discontinuance. A mechanical override can be incorporated to provide forward drive, if an electrical discontinuance should occur.

Figure 3:
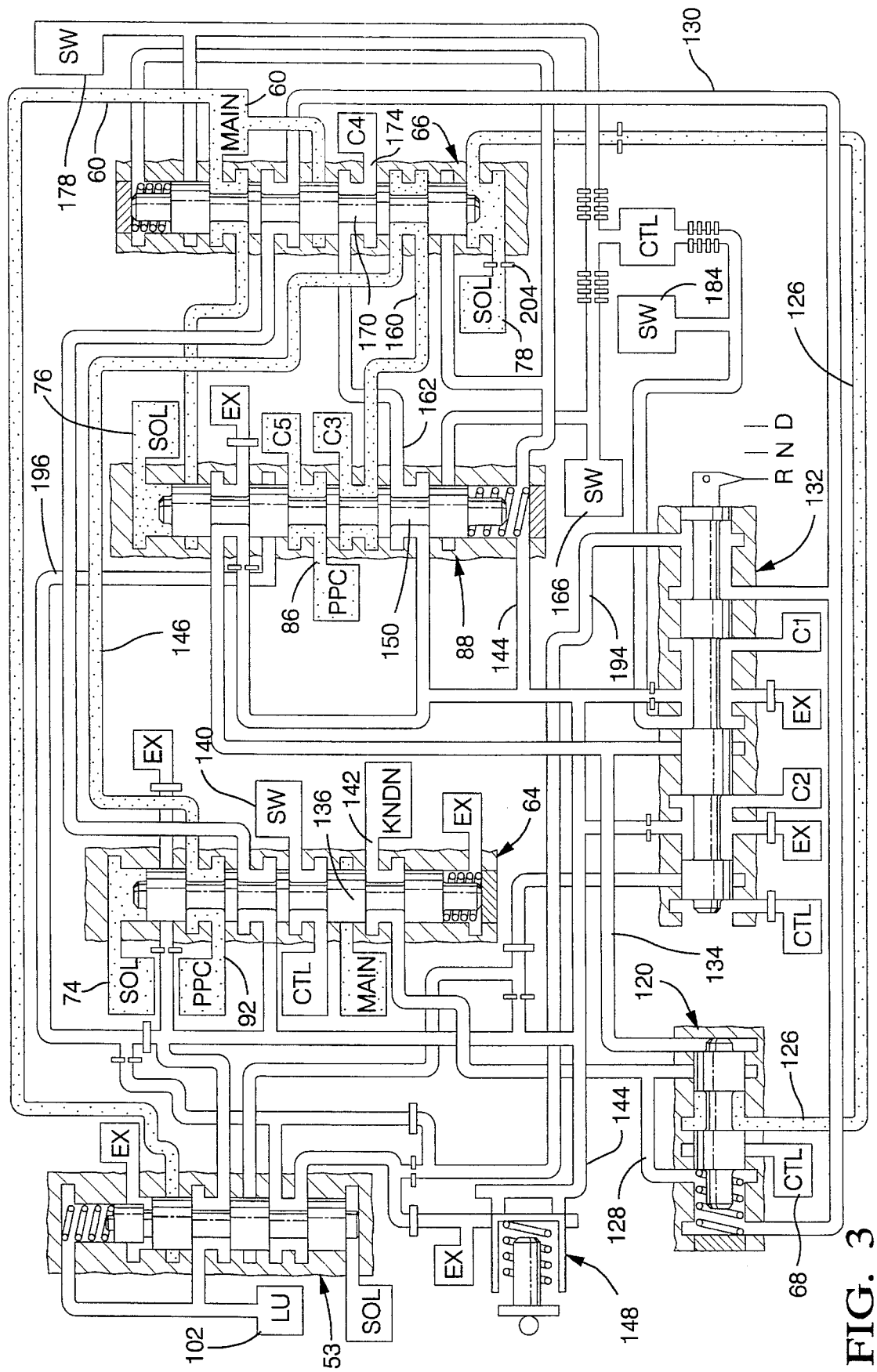
FIG. 3 is a simplified schematic view of a portion of the schematic shown in FIGS. 2A and 2B depicting the hydraulic control in the reverse condition.
Figure 4:
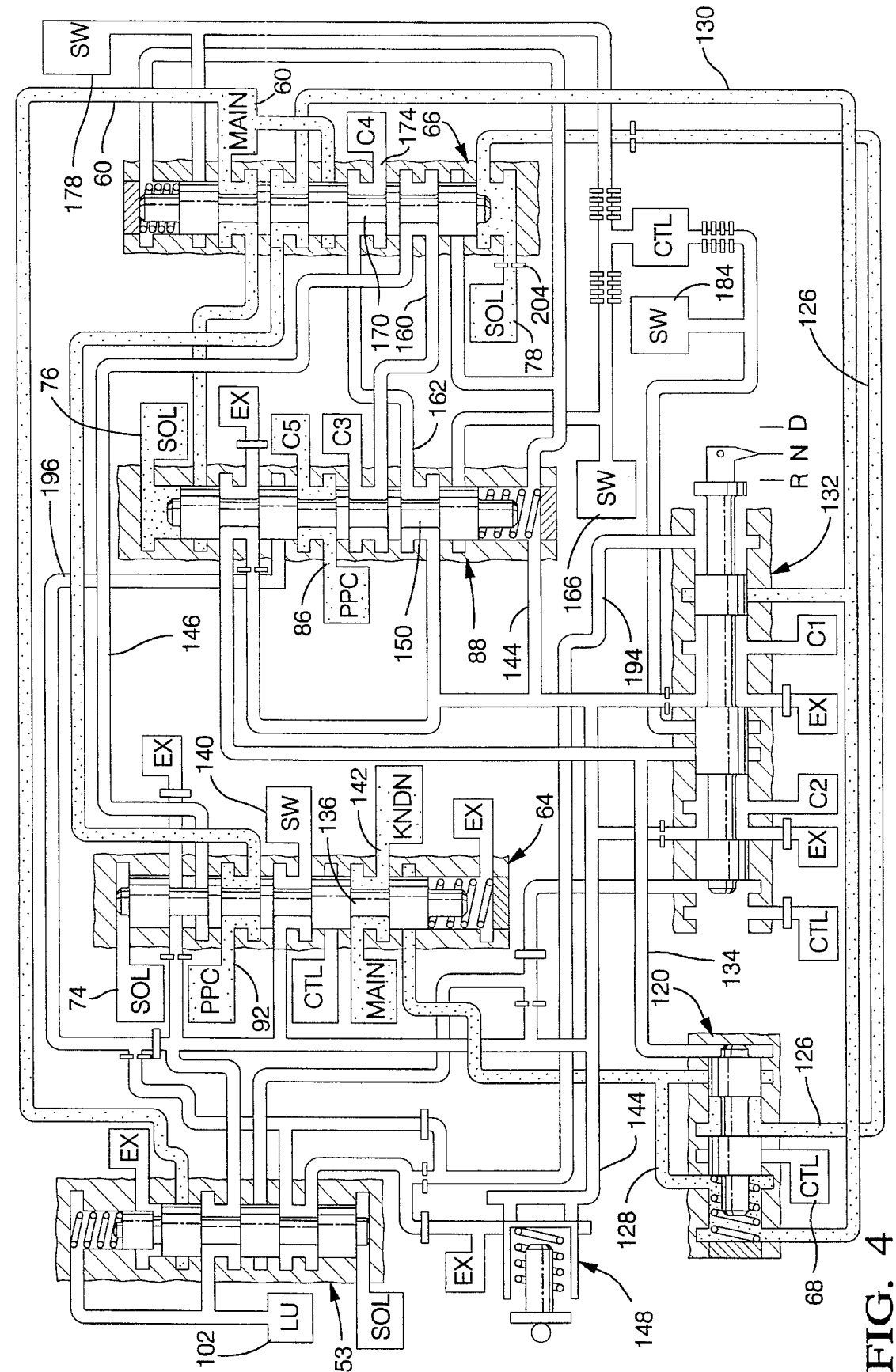
FIG. 4 is a view similar to FIG. 3 with the hydraulic control in the neutral condition.
Figure 5:
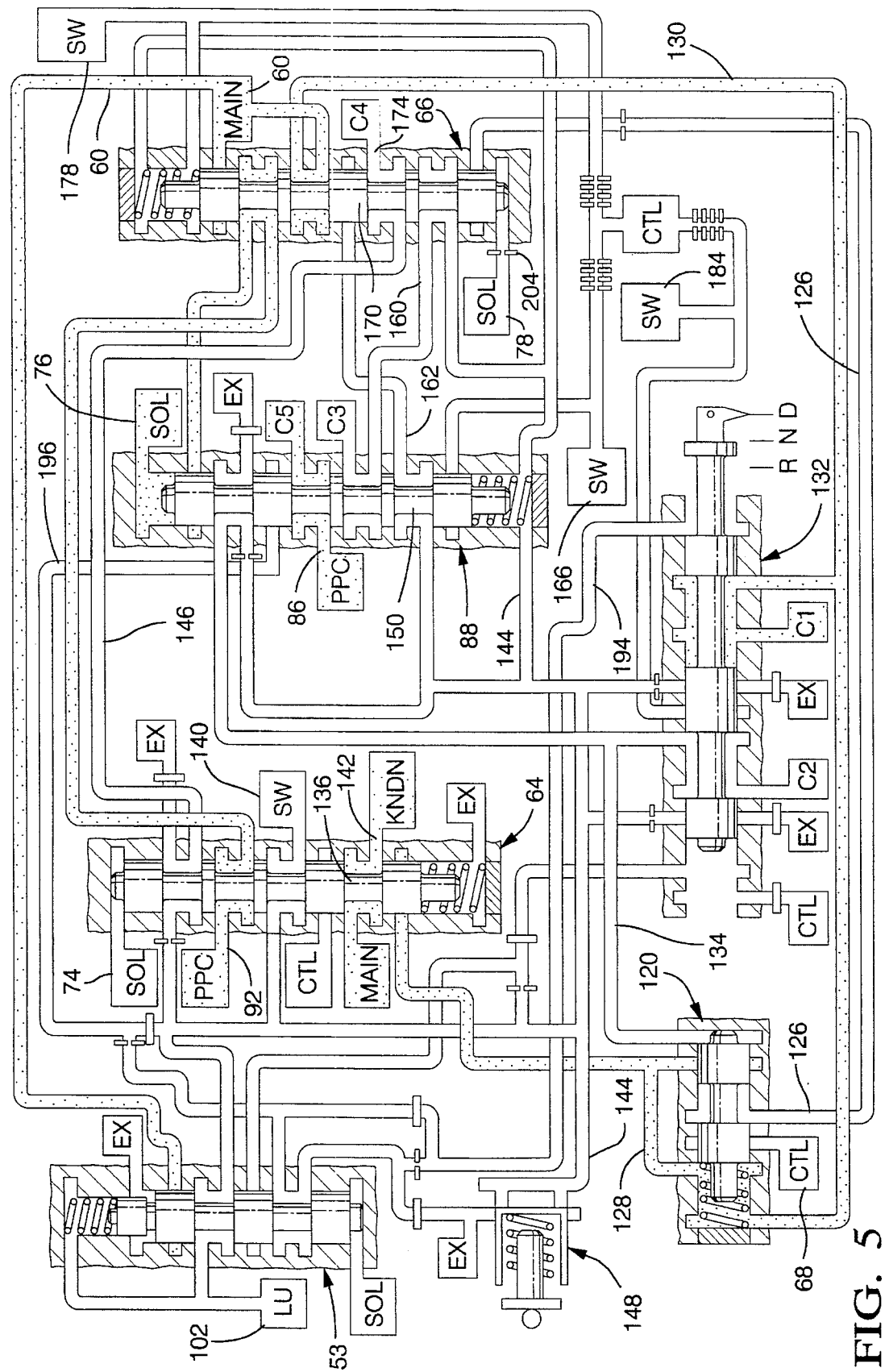
FIGS. 5 through 10 are similar to FIG. 3 and depict the hydraulic control in the forward position conditioning the transmission for operation in the first through sixth forward ratios.
Figure 6:
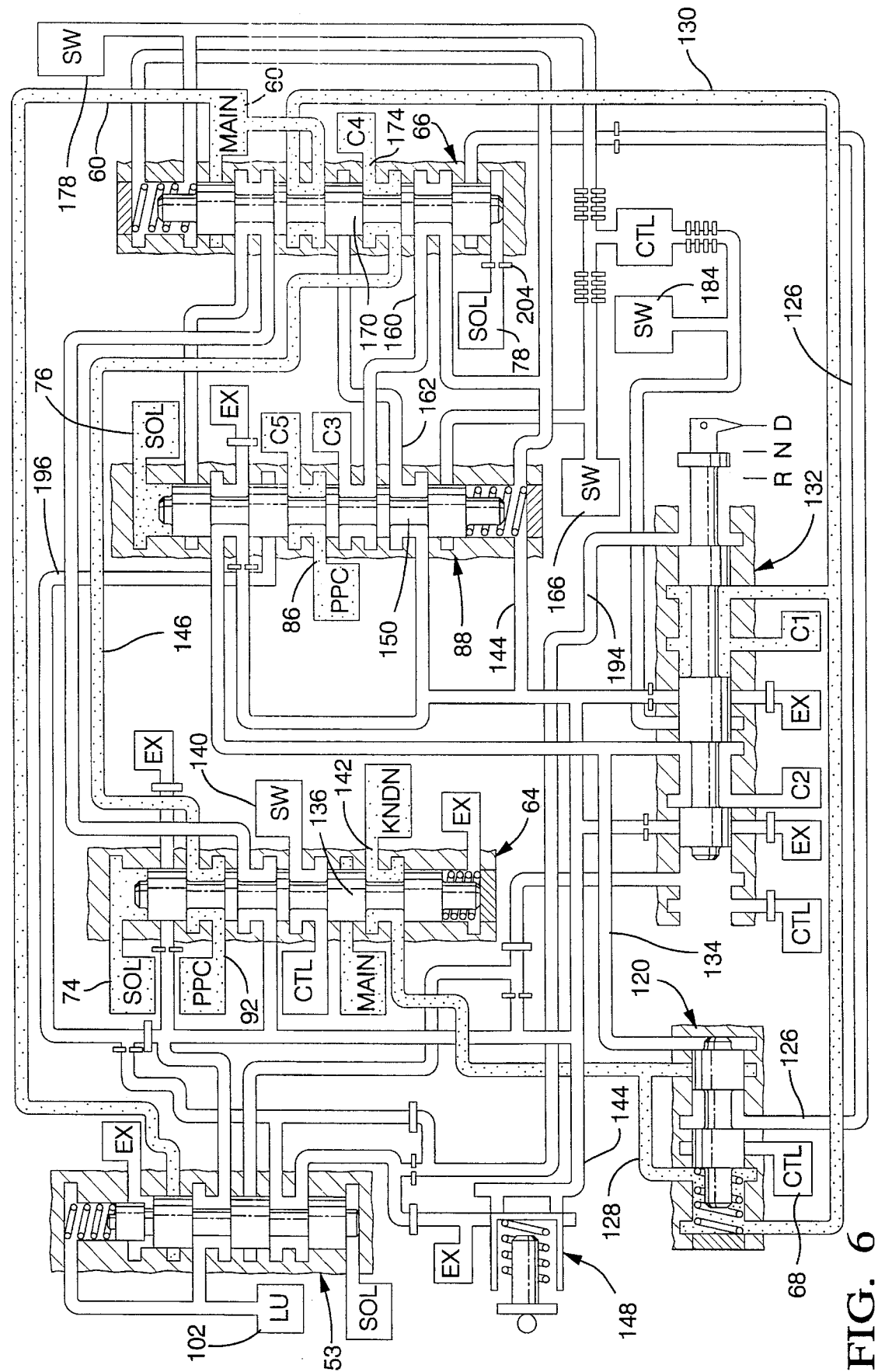
Figure 7:
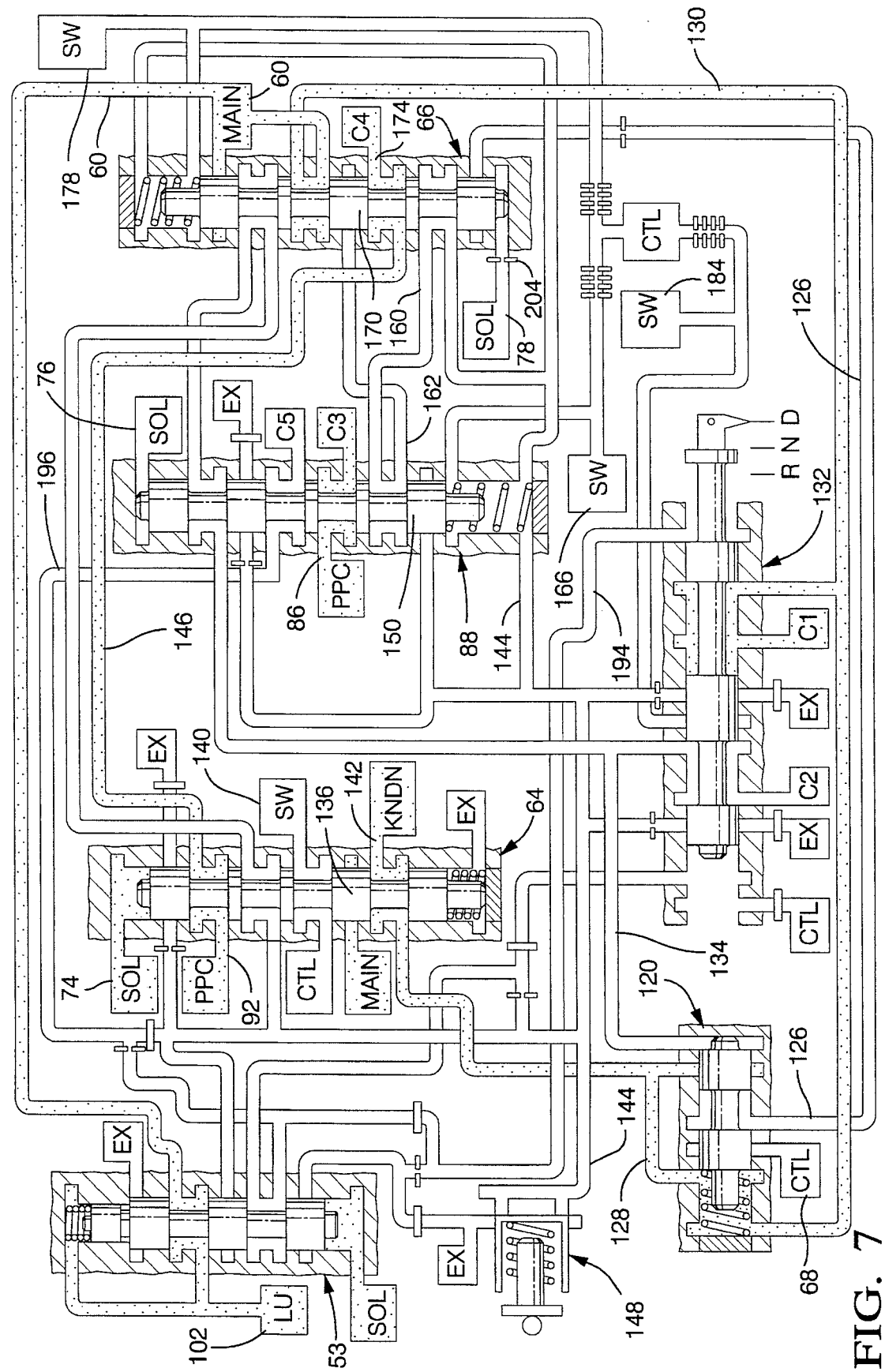

In FIG. 3, the manual selector valve 132 has been moved to the "R" or reverse position, such that the transmission is conditioned for reverse operation. As will be recalled from FIG. 1, in reverse operation, the drive is controlled by actuation of devices C3 and C5. In reverse operation, each of the solenoids 74, 76 and 78 are energized thereby positioning the valves 64, 66 and 88 in their pressure set positions. When the valve 64 is in the pressure set position, fluid pressure from passage 92 is directed through valve 64 to valve 66. From valve 66 that fluid pressure is directed through valve 88 to the friction device C3 to control the engagement of the friction device. The pressure in passage 86, which is determined by solenoid 70, is directed by valve 88 to the friction device C5.

To establish the reverse drive, C5 is fully engaged and the solenoid 72 is controlled to raise the pressure in passage 92 such that a controlled engagement of device C3 is attained and the vehicle will be placed into reverse operation. Also, it should be noted in reverse operation, that switch 166 is pressurized since the valve 88 closes the exhaust to switch 166 and therefore control pressure in passage 68 is directed to the switch. The switch 178 is also energized since the valve 66 closes the exhaust passage and the switch 140 is energized through the valve 64. Thus, it will be appreciated that the switches 140, 166 and 178 are activated whenever the respective solenoids are energized. In this manner, the control is aware of which solenoids have been activated and whether in fact the device is functioning as it is intended.

The switch 184 is exhausted through passage via the manual selector valve 132. To condition the control for the neutral position, the manual selector valve is moved to the "N" position and the electronic portion of the control deactuates or deenergizes solenoid 74 thereby permitting the valve 64 to assume the spring set position while the remaining selector valves 88 and 66 are urged to their pressure set position by the respective solenoids.

In the neutral condition, the friction device C5 is energized by the output pressure in passage 92 as determined by solenoid 70. However, no other friction devices are actuated and the transmission cannot transmit torque from the input 18 to the output 48.

To condition the transmission for forward operation, the manual selector 132 is moved to the drive position. To establish the lowest first forward ratio, the solenoid 76 is energized while the solenoids 74 and 78 are not energized. This places the valve 88 in the pressure set position and the valves 64 and 66 in the spring set position. In these positions, the main fluid pressure in passage 60 is directed through the relay valve 66 to the manual valve 132 where it is directed to the friction device C1. The fluid pressure is likewise directed to the spring end of valve 120 thereby urging the valve to the spring set position and directing fluid pressure through passage 128 to the relay valve 164. The purpose of this will become more apparent later.

To engage the forward drive, the solenoid 70 can be manipulated or energized such that the pressure in friction device C5 is reduced to zero and then returned to the desired engaged pressure for the device to control the selective and controlled engagement of the low ratio. To shift the transmission from the first ratio to the second ratio, the solenoid 74 is energized thereby placing the valve 64 in the pressure set position. In this position, the fluid pressure in passage 92 from the solenoid valve 72 is directed through the relay valve 64 to the relay valve 66 from which it is directed to the friction device C4. The main pressure in passage 60 is still directed to the manual selector valve 132 as with first ratio.

To establish the second ratio, the fluid pressure in passage 86, as controlled by solenoid 70, is reduced as the fluid pressure in passage 92 is increased thereby engaging C4 and disengaging C5. This conditions the transmission for the second ratio. It should be noted also that the relay valve 64, when placed in the pressure set position, communicates the fluid pressure in passage 128 to the forward knockdown pressure passage 142 to maintain the main control pressure at a reduced level for the second forward ratio. In the first forward ratio, the main pressure was directed through the relay valve 64 to the knockdown passage 142.

In the second ratio, it should be noted that the switch 140 is changed in state from the unactuated to the actuated position thereby informing the electronic control that the valve 64 had indeed reached its pressure set state. To manipulate the transmission or interchange the ratio of the transmission from second to third, the solenoid 76 is deenergized while the solenoid 74 remains energized. This places the valve 88 in the spring set position while the other two valves maintain the positions of the second ratio.

In the spring set position, the valve 88 directs fluid pressure in passage 86 from the valve 54 to the friction device C3. The fluid pressure in passage 92 remains directed through the relay valves 64 and 66 to the friction device C4. To complete the interchange from second ratio to third ratio, the fluid pressure in passage 86 is increased, by valve 54, while the fluid pressure in passage 92 is decreased, by valve 56, thereby interchanging the friction device C4 with the friction device C3.

In the third ratio, the switch 166 becomes deactuated with the spring set position of valve 88 thereby informing the electronic control that the valve has indeed reached the proper state for the third ratio to be engaged.

Figure 8:
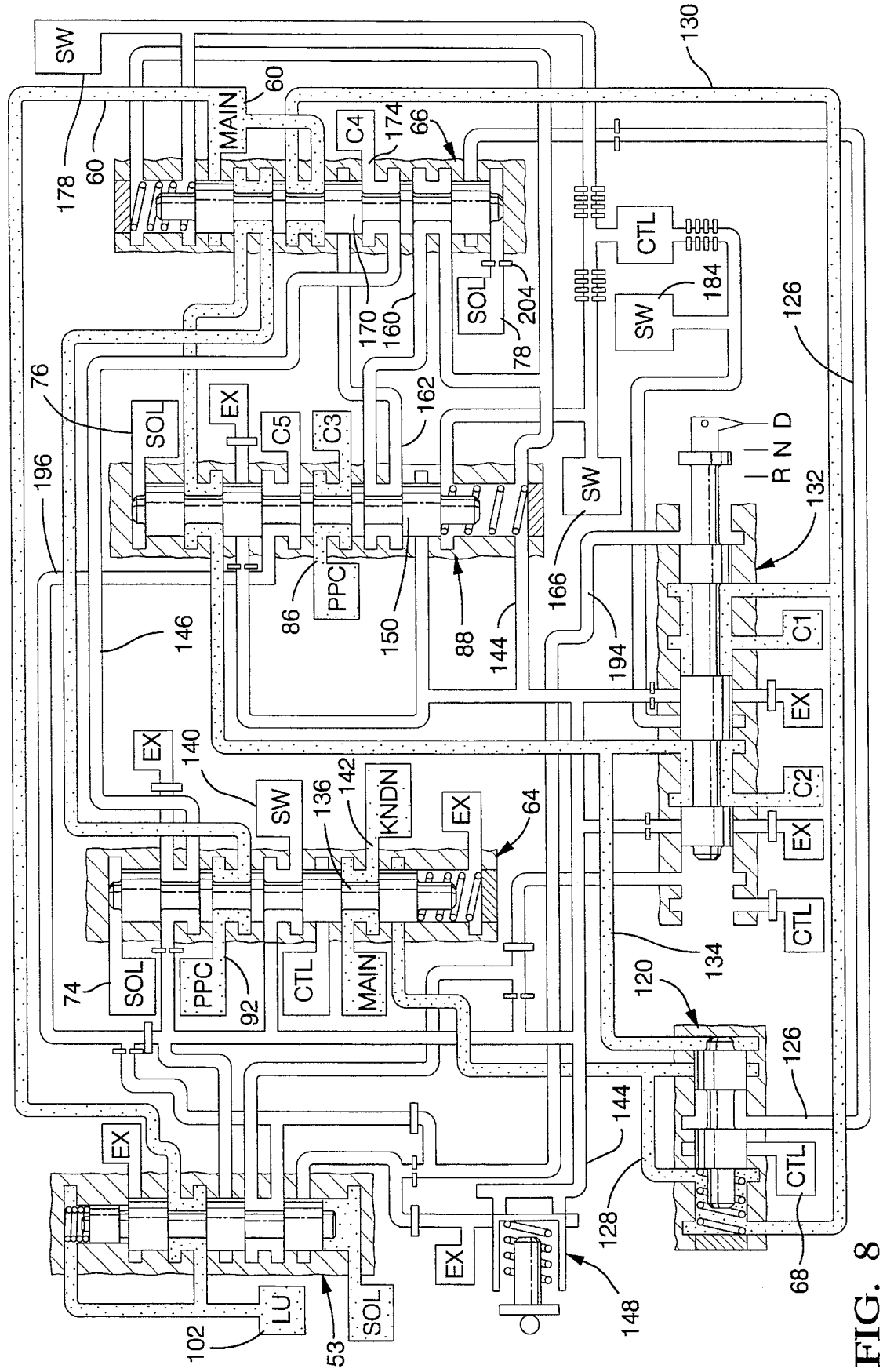
Figure 9:
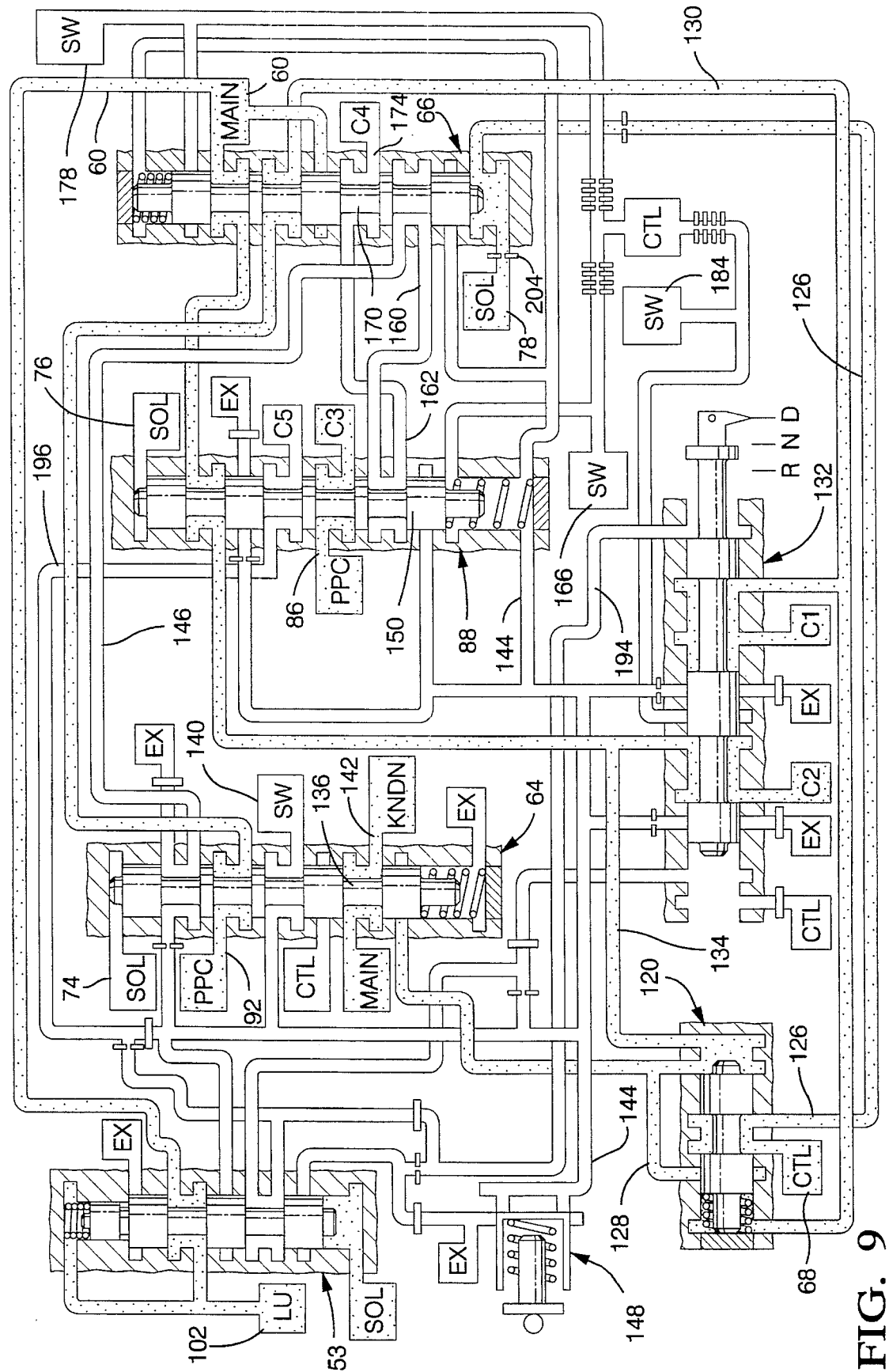
Figure 10:
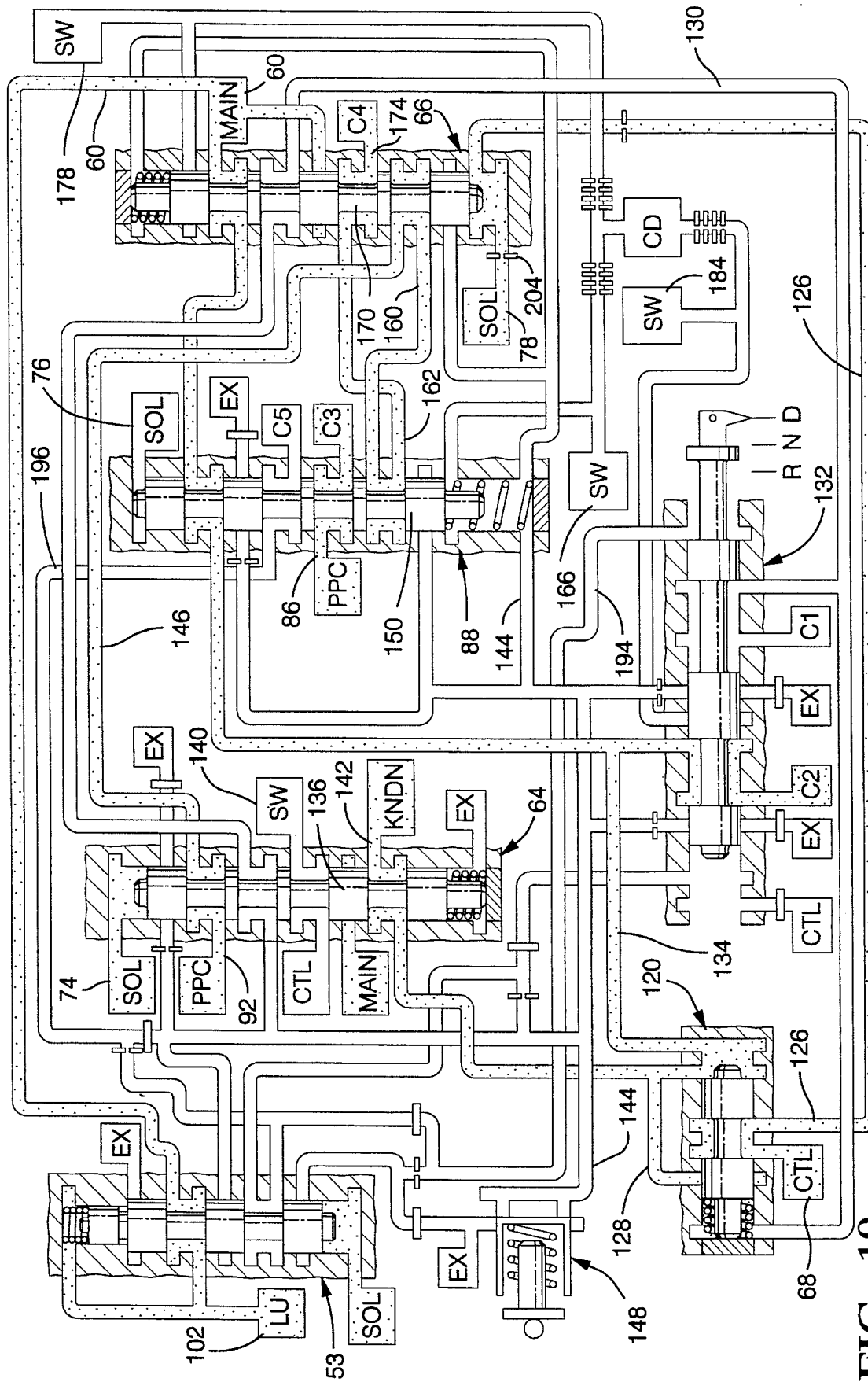

To establish the fourth ratio, as seen in FIG. 8, solenoid 74 is deenergized. With the de-energization of solenoid 74, valves 64, 66, and 88 are disposed to their spring set positions.

The spring set position of valve 66 results in distribution of main pressure in passage 130 to the manual selector valve 132. The fluid pressure in passage 92 is directed through the relay valves 64, 66 and 88 to the passage 134. The fluid pressure in passage 134 is directed by the valve 132 to the friction device C2. The fluid pressure in passage 134 is also connected with the valve 120. However, since both ends of the valve 120 are pressurized and the spring is the unbalancing force, the valve 120 remains in the spring set position. The fluid pressure from passage 92, as controlled by valve 56, is directed through the relay valve 66 to the manual valve 132 and then to the friction device C1. To control the 3–4 ratio interchange, the fluid pressure in C3 is decreased by the actuation of the valve 54, controlling the pressure in passage 86, and the fluid pressure in the passage 92, controlled by valve 56, is increased to supply pressure to the friction device C2. The friction device C1 is held fully engaged by the pressure in passage 130.

It should be noted again that the switches 178, 166 and 140 are in the unactuated position thereby informing the electronic control that the valves have assumed the proper position for fourth ratio operation.

To interchange the transmission from the fourth speed to the fifth speed, solenoid 78 is energized thereby supplying pressure in passage 60 to the friction device C2 via valve 66, 88 and 132. Fluid pressure in passage 86, as controlled by valve 54, is increased while the fluid pressure in passage 92, as controlled by valve 56, is decreased. These controlled pressure changes will result in the engagement of device C3 via valve 88, and the disengagement of device C1 via valve 66.

It should be noted that as the fluid pressure in passage 134 decreases with the decrease in pressure in passage 92, the valve 120 will assume the pressure set position such that fluid pressure in passage 68 will be communicated through a restriction with the pressure chamber of the relay valve 66. Thus, in the fifth forward ratio, the valve 66 is urged to the pressure set position by both pressure from solenoid 78 and pressure from the valve 120. The purpose for this will become more apparent later.

To provide the sixth ratio in the transmission, the solenoid valve 74 is actuated thereby causing the valve 64 to assume the pressure set position. In this position, the fluid pressure in passage 92 is directed to passage 146 which communicates with valve 66. Valve 66 directs the fluid pressure in passage 146 to the passage 160 which is communicated with valve 88. Valve 88 directs the fluid pressure in passage 160 to the passage 162 which is directed through valve 66 to the passage 174 which communicates with the friction device C4.

To establish the sixth ratio, the fluid pressure in passage 92 is increased while the fluid pressure in passage 86 is decreased thereby disengaging device C3 and engaging device C4 and device C2 remains engaged. Also, it should be noted that the pressure chamber for valve 66 remains pressurized by both solenoid 78 and the pressure in passage 126 from the control pressure passage 68.

The manipulation or actuation of solenoid 74, which resulted in the phase change from spring set to pressure set of valve 64, results in fluid pressure at valve 120 being directed through valve 64 to the passage 142 thereby maintaining the main system pressure in a reduced pressure state as compared with the reverse operation. It will be noted in FIG. 3, when the reverse ratio is being utilized, the passage 142 is connected to the passage 144 which is a controlled exhaust passage and has a very minor pressure in it. While in neutral through sixth, the passage 142 has mainline pressure imposed therein which results in a reduction of main pressure in all forward operations and in the neutral operation. This is an efficiency improving feature. Since the fluid pressure required to establish the friction devices in the forward ratios is not needed to be at a high level, the reduced mainline pressure permits the pump 50 to operate at a reduced pressure thereby reducing the horsepower requirement for the control function.

When the transmission is operating in the forward drive ranges fourth through sixth and the electrical power source should be discontinued or the solenoid functions be interrupted, the transmission will proceed with operation in the fifth ratio.

Figure 14:
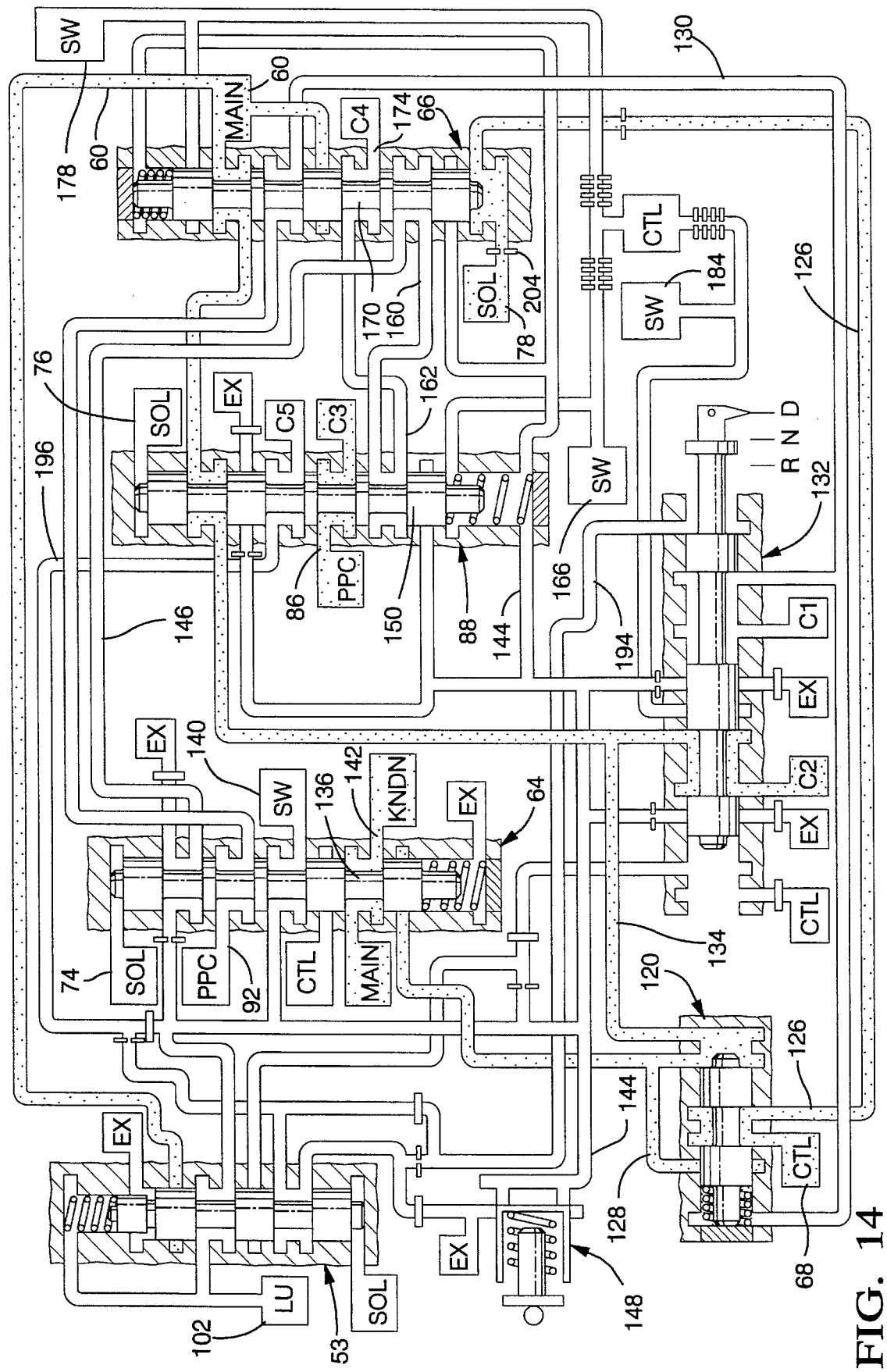
FIG. 14 shows the transmission control in the fifth ratio when no electrical source is available.

Assuming there is no electrical function, the transmission control will assume the position shown in FIG. 14. When the electrical function discontinues, the pressure in passage 92 will be reduced to zero since the solenoid 72 will have a maximum output pressure, and as previously described, this will result in low or zero pressure in passage 92. The friction device C1 will be disengaged if the transmission is operating in fourth range. This will result in the fifth range being established. If the transmission is operating in sixth range, the friction device C4 will be disengaged as pressure in passage 92 decreases.

Simultaneous with the decrease in fluid pressure in passage 92, the pressure in passage 86 will be maximum because of the fluid pressure output of valve 54. The pressure in passage 86 will engage the friction device C3. Thus, the friction devices C2 and C3 will be engaged thereby conditioning the transmission for the fifth forward speed ratio.

Figure 12:
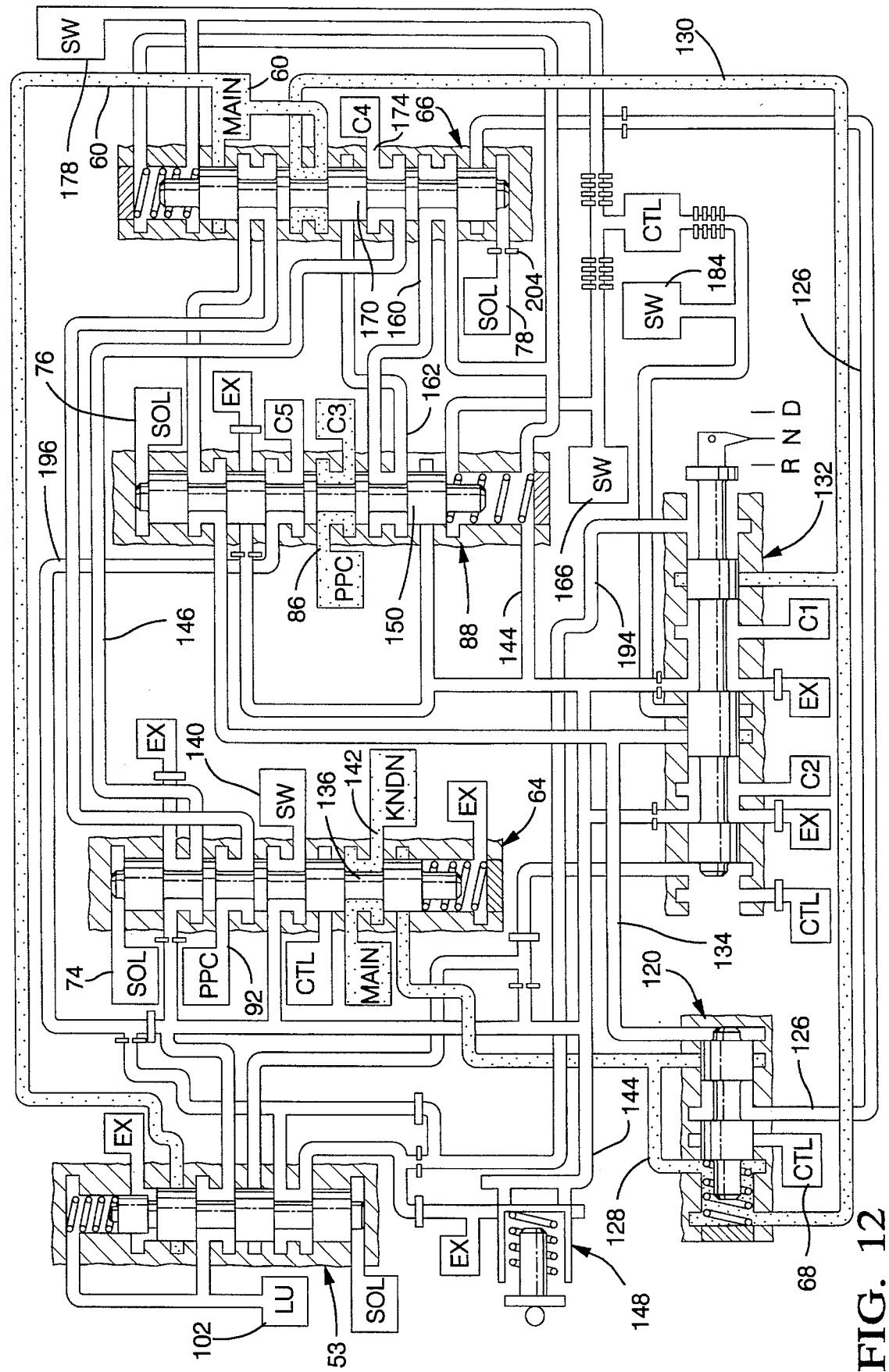
FIG. 12 depicts the transmission control in the neutral position when no electrical source is available.

When the vehicle is brought to a stop, shifted to neutral, the engine shut off, and the system pressure decreases, the valve position shown in FIG. 12 will be assumed. As can be seen in FIG. 12, the pressure, as imposed by solenoid 70, will still be actuating the friction device C3, however, the manual selector valve will prevent the actuation of friction device C2 thereby placing the transmission in the neutral position.

Figure 11:
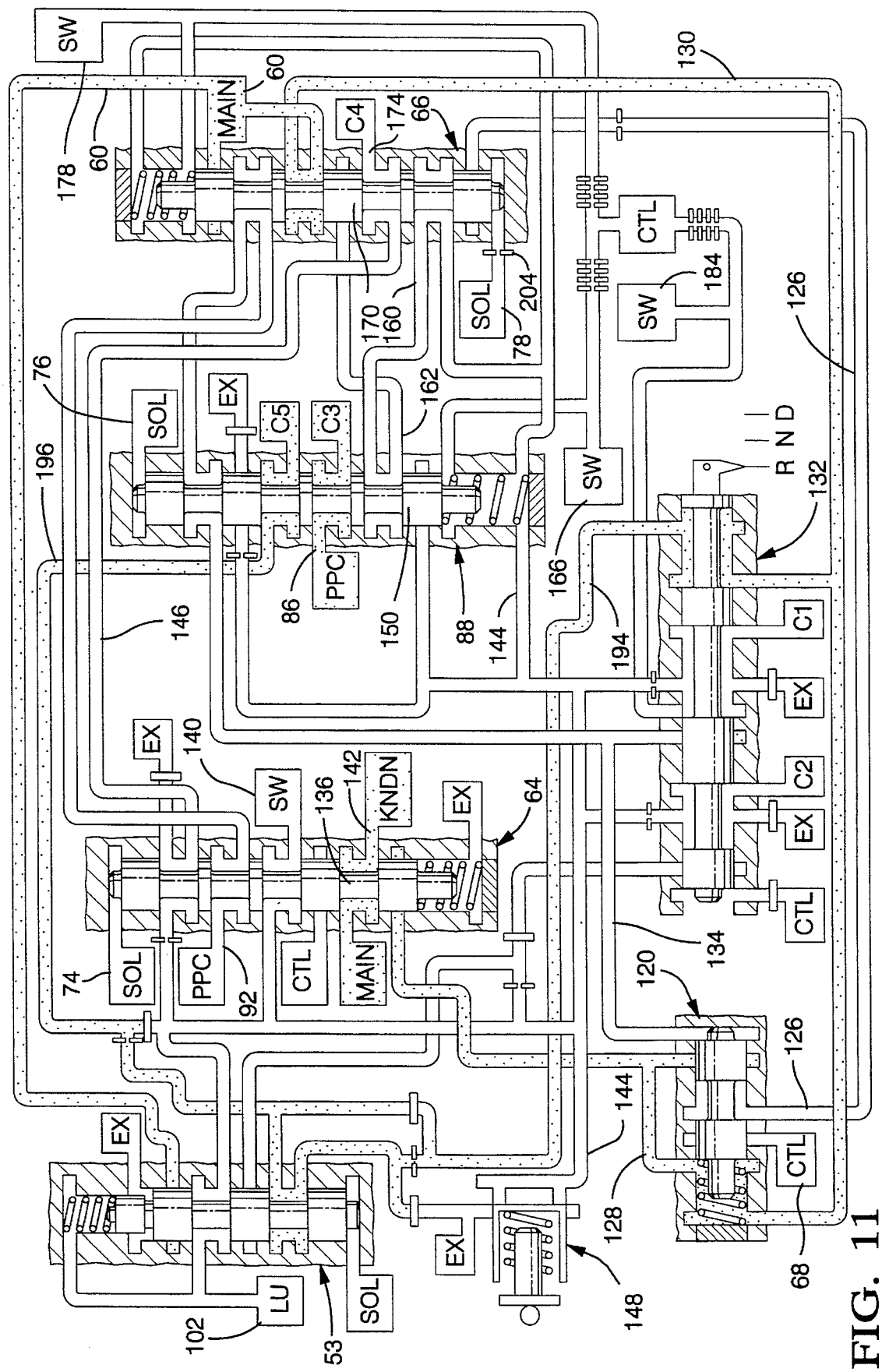
FIG. 11 depicts the hydraulic control in the reverse operation when no electrical source is available.

If the operator should desire to operate in reverse, after this electrical discontinuance, the control system will assume the position shown in FIG. 11. In FIG. 11, it is seen that the manual selector valve directs fluid pressure from the main source through the relay valve 66 to passage 130 which communicates through the manual selector valve 132 with passage 194 which in turn communicates through the pulse-width-modulated valve 53 with passage 96 which is directed through relay valve 88 to the friction device C5. Thus, C5 will be engaged when there is no electrical power available and reverse is selected.

Also, the fluid pressure in passage 86, as determined by solenoid valve 70, will be at a maximum and is directed through the relay valve 88 to the friction device C3, thereby causing engagement of that device. It will be noted, as previously discussed, that the engagement of devices C3 and C5 condition the transmission for reverse operation.

Figure 13:
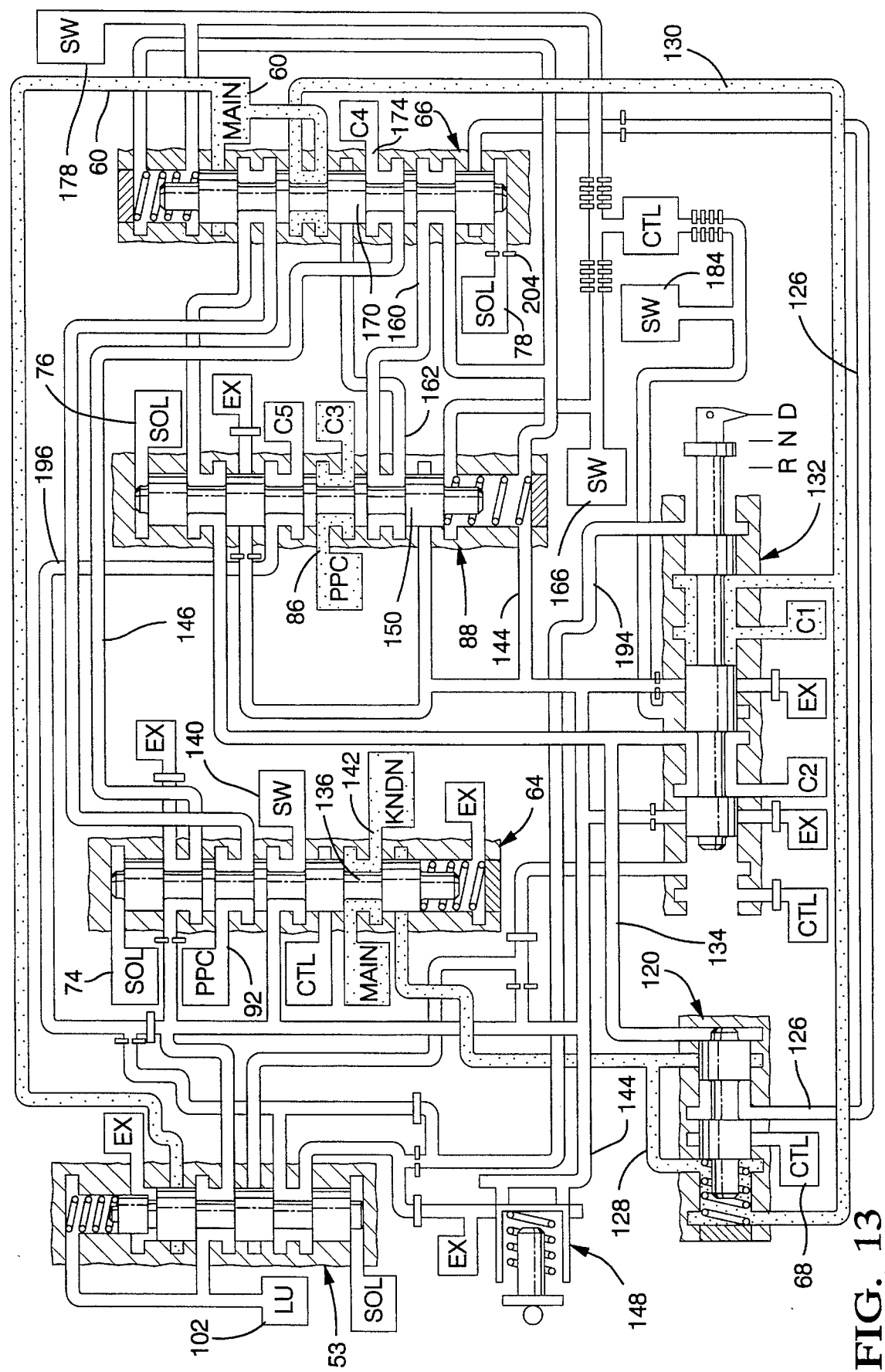
FIG. 13 shows the transmission control in the forward third ratio when no electrical source is available.

If the operator desires a forward direction of operation, the control will be positioned as shown in FIG. 13. It should be noted in this condition that the manual valve 132 directs the fluid pressure in passage 130 to the friction device C1. Again, it will be seen that the passage 130 is pressurized from main passage 60 through the relay valve 66. Also, as mentioned above, the fluid pressure in passage 86 as provided by solenoid 70 will be maximum and is directed through the relay valve 88 to the friction device C3. The engagement of devices C1 and C3 will provide the third forward ratio. Thus, the operator will be able to manipulate the manual valve even without the presence of electrical power to permit forward, reverse and neutral operation. The operator will, no doubt, be aware that some function has changed within the transmission since the first and second gear operation will not be available and therefore this will be a signal that some repair may be needed.

Also, the fact that the transmission will assume the fifth forward ratio should the electrical discontinuance occur during fourth, fifth or sixth gear operation, prevents harsh downshifts from fifth to third or sixth to second which might otherwise occur without benefit of the present invention.

It should be noted that when operating in the fifth or sixth range, the discontinuance of the electrical function will result in the valves assuming the spring set position as shown in FIG. 13. With this occurrence, the spring set position of valve 66 would result in the engagement of the C1 device and the disengagement of the C2 device and the simultaneous or retained engagement of the C3 device, thus resulting in third gear operation.

If the transmission is conditioned for the sixth ratio and the electrical discontinuance should occur, the relay valve 66 would condition the engagement of C1 and disengagement of C2 and if the sequencing of relay valve 64 was not immediate, the retained engagement of C4 would occur which would result in third and second gear operation for an instant, or it could result in a significant tie up between devices C4 and C3 since the fluid pressure in passage 86 would begin increasing with the discontinuance of the electrical function. Therefore, the retention of fifth gear operation prevents severe downshifts and/or or the tie up of two friction devices.

The main reason the transmission retains the fifth gear operation is the fact that in fifth ratio the control pressure is directed to the relay valve 66 via passage 126 from the flow distribution valve 120 as well as from the solenoid 78. The pressure in passage 126 is prevented from exhausting through the solenoid 78 by a restriction 204. Thus, the present invention provides the benefits of multiple friction device control with three relay valves and two variable pressure solenoid output mechanisms which can be utilized to control the engagement and disengagement of the oncoming and off-going friction devices, a retained pressure in all forward and neutral operation which is less than the maximum pressure level of the reverse operation, and a system which permits continued operation on electrical discontinuance.

The flow distribution valve 120 is also utilized to maintain a pressure at the valve 64 so that a knockdown control pressure in passage 142 is always available in neutral and in the forward gear ratios. This provides a reduced system pressure and increased overall efficiency of the transmission. The valve 120 cooperates with the valve 64 in the second, third and sixth ratios to supply the knockdown control pressure to the pump and regulator valve 50.

We claim:

1. A power transmission and control comprising:

a gear mechanism for providing six forward speed ratios and a reverse speed ratio including a plurality of fluid operated selectively engageable friction devices for selectively establishing the speed ratios;

an electro-hydraulic control for controlling the selective engagement and disengagement of the friction devices comprising:

a source of pressure;

first, second and third shift valves each selectively movable to first and second position;

spring means for urging each shift valve to the respective first position;

first, second and third solenoid valves being energizable for selectively supplying pressurized fluid to the first, second and third shift valves respectively for urging the respective shift valves to the second position;

first and second proportional pressure valves for delivering controlled pressure fluid;

selector valve means for selectively distributing fluid to and from a first and second of said friction devices;

said first shift valve being operable to control pressure distribution from said pressure source to said selector valve, to connect a fourth of said friction devices with said second shift valve when positioned by said spring means being operable to distribute fluid from said source to said third shift valve for distribution of fluid to a third of the friction devices from said third shift valve when said first and third solenoid valves are energized, said second shift valve when positioned by said spring means being operable to control fluid distribution from said first proportional pressure valve to said first shift valve for selective distribution thereby to one of said third shift valve and said selector valve when positioned by said spring means and said second shift valve being operable when positioned by fluid pressure to control fluid for distribution to said first shift valve for selective distribution thereby to one of said fourth friction device and said third shift valve;

said third shift valve being operable when positioned by said spring means to distribute fluid pressure from said second proportional pressure valve to the third friction device, to the first shift valve for selective exhaust of the fourth friction device and from the pressure source to the second friction device via the selector valve when the first shift valve is positioned by pressure, and said third shift valve being operable when positioned by fluid pressure to distribute fluid from the second proportional pressure valve to and from the fifth friction device and to selectively distribute fluid pressure from said first proportional pressure valve to said third friction device when said first and second shift valves are positioned by pressure.

2. A power transmission and control comprising:

a gear mechanism providing at least six forward ratios, and a reverse ratio and a plurality of selectively engageable fluid actuated torque transmitting means for establishing the speed ratios;

an electro-hydraulic control for controlling the selective actuation of the torque transmitting means comprising:

a source of fluid pressure;

three relay valves each having a spring set position and a pressure set position;

three off/on solenoid valves in fluid communication with said pressure source for directing pressure signals to respective ones of the relay valves to establish the pressure set position;

a selector valve means for permitting the selection of forward and reverse drives;

two proportional pressure control valves in fluid communication with said pressure source for directing control pressures to a first and second of said relay valves respectively;

said first relay valve being operable to distribute control pressure from one of the proportional pressure control valve to a third of the relay valves, said second relay valve being operable to selectively direct fluid pressure from the other of the proportional pressure control valves to a first and second of the torque transmitting means, said third relay valve being selectively operable to direct fluid pressure from said source of pressure to said selector valve means and to said second relay valve and to selectively direct the control pressure from said first relay valve to a third of the torque transmitting means directly and in cooperation with said second relay valve, said selector valve being operable to selectively distribute fluid pressure from the third relay valve to a fourth of the torque transmitting means and cooperating with the second relay valve to distribute fluid pressure to a fifth of the torque transmitting means, said proportional pressure control valve being operable to control fluid pressure increase in the torque transmitting means during engagement and fluid pressure decrease during disengagement.

* * * * *